Patented Apr. 28, 1936

2,038,538

UNITED STATES PATENT OFFICE 2,038,538

METHOD OF PREPARING HALO-BUTADIENES

Wallace H. Carothers, Fairville, Pa., assignor to E. I. du Pont de Nemours & Company, Wilmington, Del., a corporation of Delaware No Drawing. Application November 2, 1931, Serial No. 572,723

9 Claims. (Cl. 260—165)

This invention relates to a process for preparing halogen-substituted butadienes. It relates more specifically to the preparation of chloro-2-butadiene-1,3 from dichloro-3,4-butene-1.

Chloro-2-butadiene-1,3 was first described in a copending application of Carothers and Collins, Serial No. 490,538, filed October 22, 1930, who showed that this compound can be obtained by the addition of hydrogen chloride to vinyl acetylene. They showed further in Carothers and Collins, Serial No. 519,243, filed February 28, 1931 that chloro-2-butadiene-1,3 is capable of being polymerized to rubber-like products and to other polymers having useful properties. Muskat and Northrup (J. Am. Chem. Soc. 52, 4043 (1930), have recently shown that butadiene can be chlorinated with the formation of two isomeric dichlorides, namely, dichloro-3,4-butene-1, $CH_2Cl—CHCl—CH=CH_2$, and dichloro-1,4-butene-2, $CH_2Cl—CH=CH—CH_2—Cl$. These compounds can be separated from the chlorination product of butadiene by fractional distillation. Muskat and Northrup have alleged that when dichloro-1,4-butene-2 is treated with caustic alkali it loses hydrogen chloride with the formation of chloro-1-butadiene-1,3, $$ClCH=CH—CH=CH_2.$$

They state further that the same compound is obtained by the action of caustic alkali on dichloro-3,4-butene-1. They describe chloro-1-butadiene-1,3 as a colorless liquid which boils at 85° C. under atmospheric pressure and polymerizes on standing to a dark resinous mass.

An object of the present invention is to provide a method for the preparation of chloro-2-butadiene-1,3 which does not involve the use of vinyl acetylene as a starting material.

Other objects will appear from a study of the following description of the invention.

I have found that chloro-2-butadiene-1,3 can be prepared very easily by treating dichloro-3,4-butene-1 with caustic alkali or with another agent capable of neutralizing hydrochloric acid. The reaction consists in the elimination of hydrogen chloride and proceeds in accordance with the following equation:

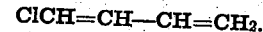

$$CH_2Cl—CHCl—CH=CH_2 \rightarrow CH_2=CHCl—CH=CH_2+HCl$$

As already mentioned, it has been stated by Muskat and Northrup that chloro-1-butadiene-1,3 is formed in this reaction. I have found, however, that chloro-2-butadiene-1,3 is the principal product of the reaction. However, in order to actually isolate chloro-2-butadiene-1,3 from the reaction it is necessary to take into account the fact that this compound polymerizes very rapidly under the action of heat, especially in the presence of air, yielding products which are, for the most part, not capable of being distilled. Chloro-2-butadiene-1,3 boils at about 60° C. at atmospheric pressure. In my process I take into account the properties indicated above. To avoid polymerization during the distillation of the chloro-2-butadiene-1,3 I either distill it under diminished pressure and/or in the presence of a polymerization inhibitor such as pyrogallol or catechol. The preparation of chloro-2-butadiene-1,3 by this process is illustrated in the following examples:

Example I

One hundred and six g. of dichloro-3,4-butene-1 and 210 g. of solid potassium hydroxide are mixed in a 500 cc. distilling flask provided with a Liebig condenser. The flask is heated by means of a water bath. At a temperature of about 95° C. a vigorous reaction sets in and chloro-2-butadiene-1,3 rapidly distills into the receiver attached to the condenser. When the vigor of the reaction has somewhat abated the flask is gently heated with a free flame to drive all of the chlorobutadiene into the receiver. The crude reaction product amounts to about 62 g. It consists essentially of chloro-2-butadiene-1,3 contaminated with some unchanged dichloro-3,4-butene-1. It may be purified by distillation. In this process of distillation it is preferable to mix with the product a small amount of a polymerization inhibitor such as pyrogallol or catechol and if the amount of material to be distilled is large (e. g., more than 150 g.) it is preferable to carry out the distillation in vacuo. The chloro-2-butadiene-1,3 obtained in this manner boils sharply at about 60° C. at atmospheric pressure and agrees in its other physical properties with those already attributed to chloro-2-butadiene-1,3 by Carothers and Collins in the copending application Serial. No. 490,538, filed October 22, 1930, referred to above, now United States Patent #1,950,431.

The dichloro-3,4-butene-1 required for this reaction can be conveniently prepared by the fractional chlorination of butadiene followed by distillation or any other suitable method may be used.

It is to be understood that the above example is illustrative only and the experimental conditions can be widely varied without departing from the intention of this invention. Thus, the potassium hydroxide may be in the form of lumps or fine powder; instead of mixing the potassium hydroxide with liquid dichloro-3,4-butene-1, the latter compound may be passed as vapor over a layer of the alkali contained in a heated tube. Other alkalies may be used in place of the potassium hydroxide such as sodium hydroxide, calcium hydroxide, calcium oxide, soda lime, etc. It is possible also to remove hydrogen chloride from dichloro-3,4-butene-1 by heating it with organic bases such as dimethyl aniline, pyridine, or quinoline. In carrying out the process diluents such as liquid organic solvents may be present if desired.

The above process has been described in connection with the preparation of chlorobutadienes. It is also applicable to the preparation of other halogen-substituted butadienes, e. g., bromobutadienes, having analogous molecular structure.

The above description of the invention is illustrative only. It is to be understood that any modification or departure from the details of invention outlined above which conforms to the principle of the invention, is intended to be included within the scope of the claims.

I claim:

1. The process of preparing chloro-2-butadiene-1,3 which comprises reacting dichloro-3,4-butene-1 with an agent which will remove one molecule of hydrogen chloride, subjecting the reaction product to fractional distillation and separating in substantially pure form a product boiling at substantially 60° C.

2. The process described in claim 1 in which the said agent is alkaline in character.

3. The process described in claim 1, in which the said agent is caustic alkali.

4. The process of preparing chloro-2-butadiene-1,3 which comprises reacting dichloro-3,4-butene-1 with an agent which will remove one molecule of hydrogen chloride, removing the formed chloro-2-butadiene-1,3 by fractional distillation and obtaining the same in a substantially pure state, the distillation being carried out in the presence of a polymerization inhibitor in order to prevent spontaneous polymerization of the chloro-2-butadiene-1,3.

5. The process of preparing chloro-2-butadiene-1,3 which comprises reacting dichloro-3,4-butene-1 with an agent which will remove one molecule of hydrogen chloride, removing the formed chloro-2-butadiene-1,3 by fractional distillation and obtaining the same in a substantially pure state, the distillation being carried out under reduced pressure in order to prevent spontaneous polymerization of the chloro-2-butadiene-1,3.

6. The process of preparing chloro-2-butadiene-1,3 which comprises reacting dichloro-3,4-butene-1 with an agent which will remove one molecule of hydrogen chloride, removing the formed chloro-2-butadiene-1,3 by fractional distillation and obtaining the same in a substantially pure state, the distillation being carried out under conditions which will inhibit polymerization of the chloro-2-butadiene-1,3.

7. The process of preparing halogen-2-butadiene-1,3 which comprises reacting a dihalogen-3,4-butene-1 with an agent which will remove one molecule of hydrogen halide, then separating the halogen-2-butadiene-1,3 in a substantially pure state by fractional distillation.

8. The process of claim 7 characterized in that the said agent is alkaline in character.

9. The process of claim 7 characterized in that the said agent is caustic alkali and the distillation is carried out under conditions which inhibit the polymerization of the halogen-2-butadiene-1,3.

WALLACE H. CAROTHERS.